(12) United States Patent
Goodman et al.

(10) Patent No.: US 7,190,132 B2
(45) Date of Patent: Mar. 13, 2007

(54) METHOD AND APPARATUS FOR MOTOR CONTROL USING RELAYS

(75) Inventors: E. Carl Goodman, Bountiful, UT (US); Kevin Banta, Highland, UT (US); D. George Field, Pleasant Grove, UT (US)

(73) Assignee: Won-Door Corporation, Salt Lake City, UT (US)

( * ) Notice: Subject to any disclaimer, the term of this patent is extended or adjusted under 35 U.S.C. 154(b) by 0 days.

(21) Appl. No.: 11/299,245

(22) Filed: Dec. 9, 2005

(65) Prior Publication Data

US 2006/0138984 A1 Jun. 29, 2006

Related U.S. Application Data

(60) Provisional application No. 60/634,815, filed on Dec. 9, 2004.

(51) Int. Cl.
*H02P 3/12* (2006.01)
(52) U.S. Cl. ........................ 318/293; 318/380
(58) Field of Classification Search ............... 318/293, 318/376–381
See application file for complete search history.

(56) References Cited

U.S. PATENT DOCUMENTS

| 4,527,103 A | * | 7/1985 | Kade | 318/293 |
|---|---|---|---|---|
| 4,544,869 A | * | 10/1985 | Pittaway | 318/293 |
| 4,910,445 A | * | 3/1990 | Borrmann | 318/468 |
| 5,046,943 A | * | 9/1991 | Muheim et al. | 431/62 |
| 5,303,156 A | | 4/1994 | Matsuoka et al. | |
| 5,568,025 A | | 10/1996 | Sumida et al. | |
| 5,760,555 A | * | 6/1998 | Yamano et al. | 318/293 |
| 5,903,121 A | | 5/1999 | Heine et al. | |
| 6,153,990 A | | 11/2000 | Feil et al. | |
| 6,486,630 B2 | * | 11/2002 | Takagi | 318/445 |
| 6,487,062 B1 | | 11/2002 | Kristiansen | |
| 6,662,848 B2 | | 12/2003 | Goodman et al. | |

FOREIGN PATENT DOCUMENTS

| DE | 4313363 | 11/1993 |
|---|---|---|
| DE | 10028490 | 1/2001 |
| JP | 06070583 | 3/1994 |
| JP | 2000-156996 | 6/2000 |

* cited by examiner

*Primary Examiner*—Bentsu Ro
(74) *Attorney, Agent, or Firm*—TraskBritt

(57) ABSTRACT

An apparatus and method for controlling motors using relays is disclosed. The invention includes causing rotation of the motor in a first rotation direction if a first control signal is asserted and causing rotation of the motor in a second rotation direction if a second control signal is asserted. The invention further includes impeding rotation of the motor if both the first control signal and the second control signal are asserted, or if both the first control signal and the second control signal are negated.

22 Claims, 2 Drawing Sheets

METHOD AND APPARATUS FOR MOTOR CONTROL USING RELAYS

CROSS-REFERENCE TO RELATED APPLICATIONS

The present application claims the benefit of U.S. Provisional Application Ser. No. 60/634,815 entitled METHOD AND APPARATUS FOR MOTOR CONTROL USING RELAYS filed on Dec. 9, 2004, the disclosure of which is incorporated by reference herein in its entirety.

BACKGROUND OF THE INVENTION

1. Field of the Invention

The present invention relates generally to motor control circuits and more specifically to motor control circuits configured to control rotational direction of the motor, dynamic braking of the motor, and protection of the motor and motor control circuits from possibly harmful electrical energy.

2. State of the Art

Motor relay arrangements in an H-bridge configuration are conventionally used to control Direct Current (DC) motor direction. In its basic form, an H-bridge circuit typically includes four relays. On one side of the motor, a first relay connects a first motor terminal to a power source or an open circuit and a second relay connects the first motor terminal to ground or an open circuit. On the other side of the motor, a third relay connects a second motor terminal to a power source or an open circuit and a fourth relay connects the second motor terminal to ground or an open circuit. The H-bridge operates to cause current to flow through the motor, and cause forward rotation by energizing the first relay and the fourth relay, which causes current to flow through the first relay, through the motor from the first motor terminal to the second motor terminal, then to ground through the fourth relay. Similarly, to cause a backward rotation, the second relay and the third relay are energized, causing current to flow through the third relay, through the motor from the second motor terminal to the first motor terminal, then to ground through the second relay. Unfortunately, if the wrong combination of relays is energized, too much current may flow through the relays resulting in various problems including, for example, damage to the circuit, the motor, or both.

Various improvements have addressed this problem. One such improvement is U.S. Pat. No. 6,153,990, entitled "Relay Circuit for High Voltage Operation of a Bi-Directional DC Motor." In this patent, three relays are utilized. A first relay is energized to provide a path to ground anytime a forward signal or a reverse signal is asserted. The path to ground, which is an output of the first relay, connects to a second relay and a third relay. The second relay and third relay are configured to steer the current from a power signal through the motor and to the path to ground. The second relay and third relay steer the current in one direction if a forward signal is asserted and the other direction if a reverse signal is asserted. The first relay additionally prevents excessive current from flowing through the relays by interrupting current to the second relay and third relay any time both the forward signal and the reverse signal are negated.

Unfortunately, because the first relay is energized when the forward signal or the reverse signal is asserted, the current interruption may be circumvented when both the forward signal and the reverse signal are asserted simultaneously. Furthermore, prior art circuits may not protect the H-bridge relays from arcing when the motor is placed in a dynamic braking mode where both terminals of the motor are placed at the same voltage potential.

A need exists to control a DC motor in both the forward rotational direction and the reverse rotational direction, enable dynamic braking of the motor, improve the performance of dynamic braking, and protect the contacts of the relays in the motor control circuit. In addition, a need exists for the motor control circuit to operate appropriately while also preventing damage to the components of the motor or the control circuitry for all logical combinations of control signals for forward and reverse rotational directions.

BRIEF SUMMARY OF THE INVENTION

The present invention provides a motor control circuit for controlling the rotational direction of a motor while enabling dynamic braking and protecting various components of the circuit and the motor and providing additional improvements and advantages over the prior art.

In one exemplary embodiment of the present invention, a method of controlling a motor is provided. The method includes causing rotation of the motor in a first rotation direction if a first control signal is asserted and a second control signal is negated. The method further includes causing rotation of the motor in a second rotation direction if the first control signal is negated and the second control signal is asserted. The method further includes impeding rotation of the motor if both the first control signal and the second control signal are asserted, or if both the first control signal and the second control signal are negated. When the act of impeding rotation of the motor occurs, rotational inertia energy of the motor is dissipated through an impedance element.

In another exemplary embodiment of the present invention, a motor control circuit is provided. The circuit includes a first relay configured for operably coupling a power source to a first relay output when a first control signal is asserted, and operably coupling a ground to the first relay output when the first control signal is negated. A second relay is configured for operably coupling the power source to a second relay output when a second control signal is asserted, and operably coupling the ground to the second relay output when the second control signal is negated.

A logic element is configured for negating an enable signal if both the first control signal and the second control signal are asserted, or negating the control signal if both the first control signal and the second control signal are negated, and otherwise asserting the enable signal. A third relay is configured for operably coupling a first motor terminal to the first relay output when the enable signal is asserted, and operably coupling the first motor terminal to a third relay input when the enable signal is negated. A fourth relay is configured for operably coupling a second motor terminal to the second relay output when the enable signal is asserted, and operably coupling the second motor terminal to a fourth relay input when the enable signal is negated. A connection element operably couples the third relay input to the fourth relay input.

Another embodiment of the present invention may include a motor system including a motor and a motor control circuit such as the exemplary motor circuit described above. In one embodiment, the motor may include a direct current (DC) motor rated at approximately 14 volts or higher. In another exemplary embodiment, the motor may include a DC motor rated at approximately 24 volts.

The system may include additional components depending, for example in the intended application of the motor. For example, in one embodiment the motor may be operably coupled to a portion of a movable partition in order to deploy and retract or otherwise displace the partition. Such a partition may include, for example, a folding or accordion-style door having a plurality of hingedly coupled panels. The partition may be configured as a fire barrier in one particular example. Of course, the system may include other components and be configured for other applications as will be appreciated by those of ordinary skill in the art.

DETAILED DESCRIPTION OF THE INVENTION

In the following description, circuits may be shown in block diagram form in order not to obscure the present invention in unnecessary detail. Additionally, block definitions and partitioning of logic between various blocks is exemplary of a specific implementation. It will be appreciated by those of ordinary skill in the art that the present invention may be practiced by numerous other partitioning solutions. For the most part, details concerning timing considerations and the like have been omitted inasmuch as such details are not necessary to obtain a complete understanding of the present invention and are within the ability of persons of ordinary skill in the relevant art.

The terms "assert" and "negate" are respectively used when referring to the rendering of a signal, status bit, or similar apparatus into its logically true or logically false state. If the logically true state is a logic level one, the logically false state will be a logic level zero. Conversely, if the logically true state is a logic level zero, the logically false state will be a logic level one.

Figure 1:
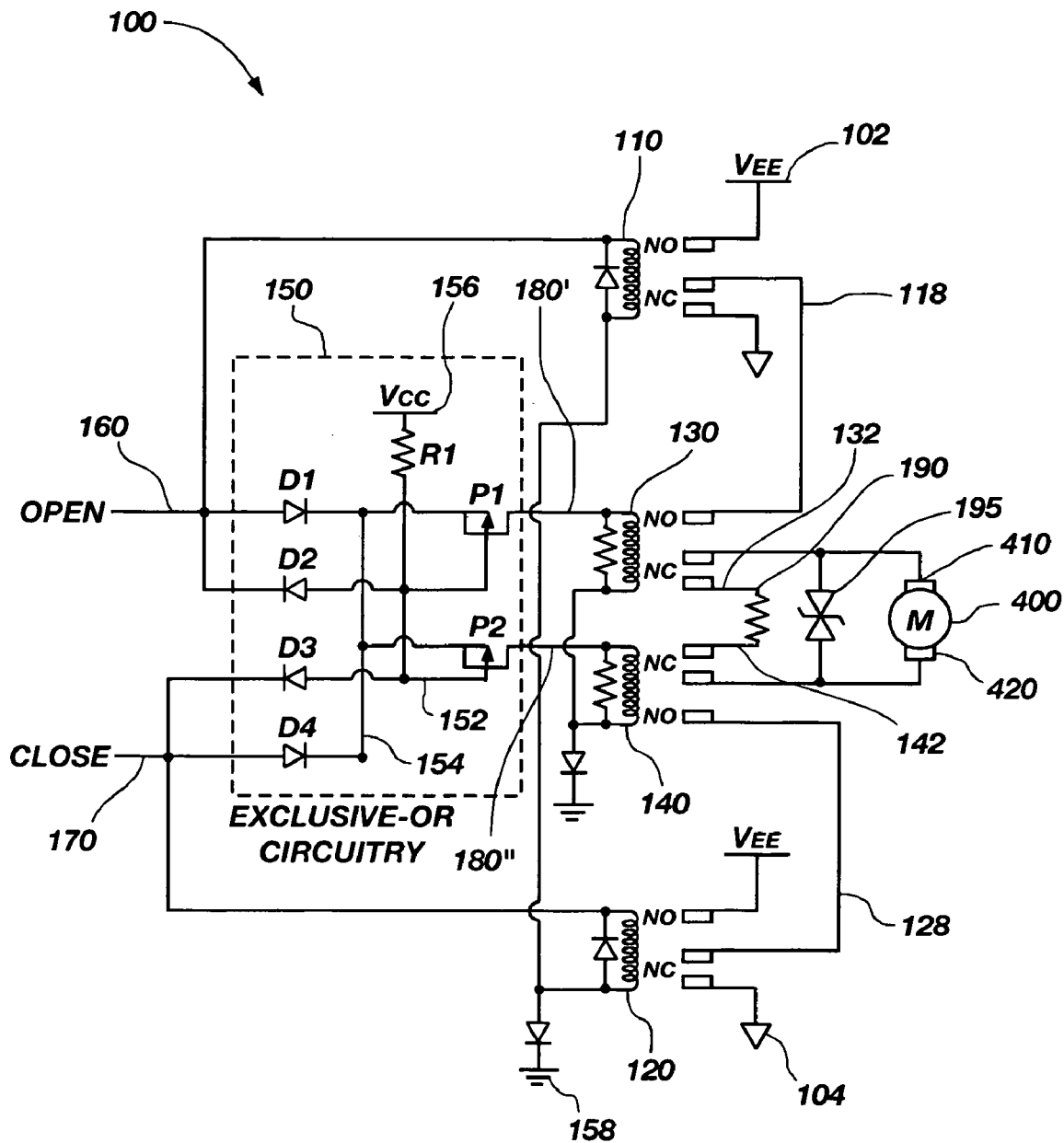
FIG. 1 is a diagram of an exemplary embodiment of motor and a circuit for controlling the motor.

FIG. 1 depicts an exemplary embodiment of a motor 400 and a motor control circuit 100. The motor control circuit 100 includes a first relay 110, a second relay 120, a third relay 130, a fourth relay 140, a logic element 150, a connection element 190, and an over-voltage protector 195. The motor 400 may include a DC motor which, as will be appreciated by those of ordinary skill in the art, may include a stator-rotor combination or a commutator-armature combination configured to effect rotational motion of an output component such as a shaft. In one particular embodiment, the present invention may be practiced with a motor rated at 14 volts DC or higher, such as a 24 volt DC motor, although motors of other voltages may be utilized with the present invention.

As used herein, the terms "rotating the motor," effecting, causing, or inducing "rotation" of the motor, or a "rotational mode" of the motor, refer to the relative rotational movement between the components of a motor such as a rotor and stator.

In one exemplary embodiment of the present invention, a logic element 150 implements an exclusive-OR functionality by generating an enable signal that is the exclusive-OR of a first control signal 160 (also referred to as an open signal) and a second control signal 170 (also referred to as a close signal). In the embodiment shown in FIG. 1, the logic element 150 generates a first enable signal 180' and a second enable signal 180". However, a person of ordinary skill in the art will recognize that the first enable signal 180' and the second enable signal 180" will be at the same voltage potential because both p-channel devices (P1 and P2) shown in the logic element 150 are connected in parallel. In other words, the sources of both p-channel devices (P1 and P2) are connected together and the gates of both p-channel devices (P1 and P2) are connected together. As a result, an embodiment with similar functionality may connect the first enable signal 180' and the second enable signal 180" together to create a single enable signal 180, which may connect to both the third relay 130 and the fourth relay 140. Hereinafter the description generally refers to the enable signal 180 except where needed for clarification of connection differences between the first enable signal 180' and the second enable signal 180".

The exclusive-OR functionality implemented in the presently described motor control circuit 100 causes the enable signal 180 to be negated when both the open signal 160 and the close signal 170 are asserted. Similarly, the enable signal 180 is negated when both the open signal 160 and the close signal 170 are negated. Conversely, the enable signal 180 is asserted when only a single one of either the open signal 160 or the close signal 170 is asserted.

In operation of the logic element 150 of FIG. 1, the p-channel devices (P1 and P2) have their gates connected together at a gate node 152, which connects to a resistive pull-up device R1. The resistive pull-up device connects to a control power source 156, which is suitable for energizing the relays (110, 120, 130 140) and exhibits a voltage level similar to that of the open signal 160 and close signal 170. The gate node 152 also connects to the anodes of a second diode D2 and a third diode D3. The second diode D2 cathode connects to the open signal 160 and the third diode D3 cathode connects to the close signal 170. As a result, if the open signal 160 is low (i.e., negated), the close signal 170 is low (i.e., negated), or both the open signal 160 and the close signal 170 are low, one or both of the second diode D2 and third diode D3 will be forward biased, pulling the gate node 152 low. On the other hand, if both the open signal 160 and close signal 170 are high, the second diode D2 and third diode D3 are not forward biased, and the resistive pull-up device R1 will pull the gate node 152 high.

The sources of the p-channel devices (P1 and P2) connect to a source node 154. The source node 154 connects to the cathodes of a first diode D1 and a fourth diode D4. The first diode D1 anode connects to the open signal 160 and the fourth diode D4 anode connects to the close signal 170. As a result, if the open signal 160 is high (i.e., asserted), the close signal 170 is high (i.e., asserted), or both the open signal 160 and the close signal 170 are high, one or both of the first diode D1 and fourth diode D4 will be forward biased, allowing current to flow to the source node 154. On the other hand, if both the open signal 160 and close signal 170 are low, the first diode D1 and fourth diode D4 are not forward biased, and current may not flow to the source node 154.

With this configuration for the logic element 150, if both the open signal 160 and close signal 170 are high, the gate node 152 is high and the p-channel devices (P1 and P2) are off, resulting in a low enable signal 180. If both the open signal 160 and close signal 170 are low, current may not flow to the source node 154 through the first diode D1 and the fourth diode D4. In addition, because the gate node 152 is low, the p-channel devices (P1 and P2) may be turned on until the source node 154 is pulled near the threshold voltage of the p-channel devices (P1 and P2). These logic states create the logic function of a negated enable signal 180' (i.e., low) if both the open signal 160 and close signal 170 are asserted, or if both the open signal 160 and close signal 170 are negated.

If the open signal 160 is asserted and the close signal 170 is negated, the first diode D1 is forward biased, pulling the source node 154 high, and the third diode D3 is forward biased, pulling the gate node 152 low. As a result, the p-channel devices (P1 and P2) are on and the enable signal 180 will be pulled high.

If the open signal 160 is negated and the close signal 170 is asserted, the fourth diode D4 is forward biased, pulling the source node 154 high, and the second diode D2 is forward biased, pulling the gate node 152 low. As a result, the p-channel devices (P1 and P2) are on and the enable signals 180 will be pulled high.

In operation, the motor control circuit 100 may be thought of as operating in a dynamic braking mode when the enable signal 180 is negated, and a rotational mode when the enable signal 180 is asserted.

In the rotational mode, the motor control circuit 100 may cause the motor 400 to rotate in a first rotation direction or in a second rotation direction, depending on the state of the open signal 160 and the close signal 170. In the rotational mode, the motor 400 is enabled to rotate, because when the enable signal 180 is asserted, the third relay 130 and the fourth relay 140 are energized allowing connections of a first motor terminal 410 and a second motor terminal 420 to either a power source 102 or a ground 104 depending on the state of the open signal 160 and the close signal 170. The power source 102 includes a voltage suitable for driving a DC motor rated at 14 volts DC or higher, such as a 24 volt DC motor, although motors of other voltages may be utilized with the present invention. In addition, the ground 104, for use in connection to the motor 400, may be electrically isolated from a control ground 158, used for energizing the relays (110, 120, 130, 140).

The motor 400 may rotate in the first rotation direction if the open signal 160 is asserted and the close signal 170 is negated. The first rotation direction is enabled because the asserted open signal 160 energizes the first relay 110 to connect the power source 102 to a first relay output 118 and the asserted enable signal 180 energizes the third relay 130 to connect the first relay output 118 to the first motor terminal 410. As a result, the power source 102 connects to the first motor terminal 410 through the first relay 110 and third relay 130. Similarly, the negated close signal 170 de-energizes the second relay 120 to connect ground 104 to a second relay output 128 and the enable signal 180 energizes the fourth relay 140 to connect the second relay output 128 to the second motor terminal 420. As a result, the ground 104 connects to the second motor terminal 420 through the second relay 120 and the fourth relay 140. With these relay states, the first motor terminal 410 connects to the power source 102 and the second motor terminal 420 connects to ground 104, which may cause the motor 400 to rotate in the first rotation direction.

On the other hand, the motor 400 may rotate in the second rotation direction if the open signal 160 is negated and the close signal 170 is asserted. The second rotation direction is enabled because the asserted close signal 170 energizes the second relay 120 to connect the power source 102 to the second relay output 128 and the asserted enable signal 180 energizes the fourth relay 140 to connect the second relay output 128 to the second motor terminal 420. As a result, the power source 102 connects to the second motor terminal 420 through the second relay 120 and fourth relay 140. Similarly, the negated open signal 160 de-energizes the first relay 110 to connect ground 104 to the first relay output 118 and the enable signal 180 energizes the third relay 130 to connect the first relay output 118 to the first motor terminal 410. As a result, the ground 104 connects to the first motor terminal 410 through the first relay 110 and the third relay 130. With these relay states, the first motor terminal 410 connects to ground 104 and the second motor terminal 420 connects to the power source 102, which may cause the motor 400 to rotate in the second rotation direction.

When in the dynamic braking mode, the enable signal 180 is negated, which causes both the third relay 130 and the fourth relay 140 to be un-energized. As a result, in the dynamic braking mode, the first motor terminal 410 connects to a third relay input 132. Similarly, the second motor terminal 420 connects to a fourth relay input 142. The third relay input 132 connects to one side of the connection element 190 and the fourth relay input 142 connects to the other side of the connection element 190. These connections in the dynamic braking mode place the connection element 190 in a shunt configuration across the motor terminals (410 and 420) and isolate the motor terminals (410 and 420) from the first relay 110 and second relay 120.

In the exemplary embodiment of FIG. 1, the connection element 190 is a resistor. This load resistance connects the normally closed contacts of the third relay 130 and fourth relay 140 to the load resistance allowing the energy from rotational inertia (i.e., back electromotive force) to be quickly dissipated through the resistor as heat. In addition, this shunting enables the motor 400 while limiting possible damage to the relay contacts through heating of the contacts. It will be readily apparent to a person of ordinary skill in the art that other connection elements 190 are possible and contemplated within the scope of the invention. For example, the connection element 190 may include an impedance characteristic (including capacitance and inductance characteristics) to enable reaction to dynamic changes in electrical energy, rather than simply a resistance characteristic.

An additional circuit may be added to quench arcing phenomena, which may occur across the dynamic braking contacts of the third relay 130 and fourth relay 140. This additional circuit is shown as an over-voltage protector 195, which may allow safe current bypass across the third relay 130 and fourth relay 140 for large voltage spikes. These large voltage spikes may occur when the contacts of the third relay 130 and fourth relay 140 swap from the normal open position (i.e., rotational mode) to the normal closed position (i.e., dynamic braking mode).

In another function of the logic element 150, a delay occurs between a change in the open signal 160 or the close signal 170 and a change in the enable signal 180. This delay has the effect of preventing a short that may occur between the power source 102 and the ground 104 if contacts of the third relay 130 and the fourth relay 140 are naturally arcing due to the back electromotive force of the motor. By turning off the relays on the power sources first, before the motor field collapses, the possibility of blowing out a wiper of the motor due to the full capacity of the power source 102 is substantially reduced. In other words, the timing sequence switches the power side relays (110 and 120) first, then the motor side relays (130 and 140).

It will be appreciated by a person of ordinary skill in the art that implementations of the relay configurations relating to the logic levels of the open signal 160 and the close signal 170, as well as configurations of the relays (110, 120, 130, 140) relating to energizing of the relays' coils and the normally open and normally closed positions of the relays' contacts may vary, while still being encompassed by the scope of the present invention.

Figure 2A:
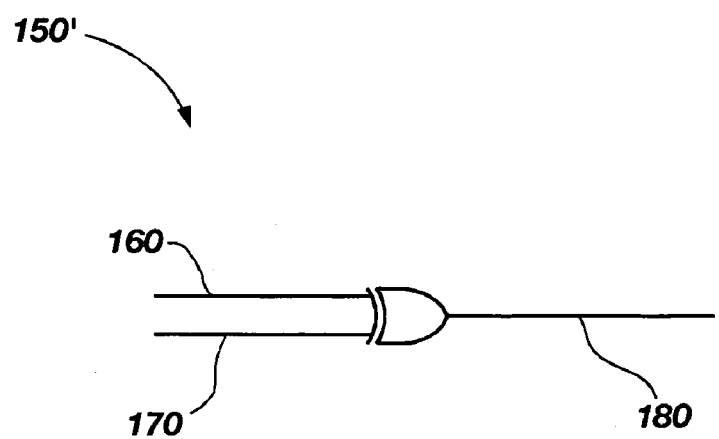
FIGS. 2A and 2B are circuit diagrams of additional exemplary implementations of an enable circuit according to the present invention.

FIG. 2A illustrates a conventional exclusive-OR logic element 150' as another exemplary embodiment that may be used to perform the exclusive-OR functions of the logic element 150 described with respect to FIG. 1.

Figure 2B:
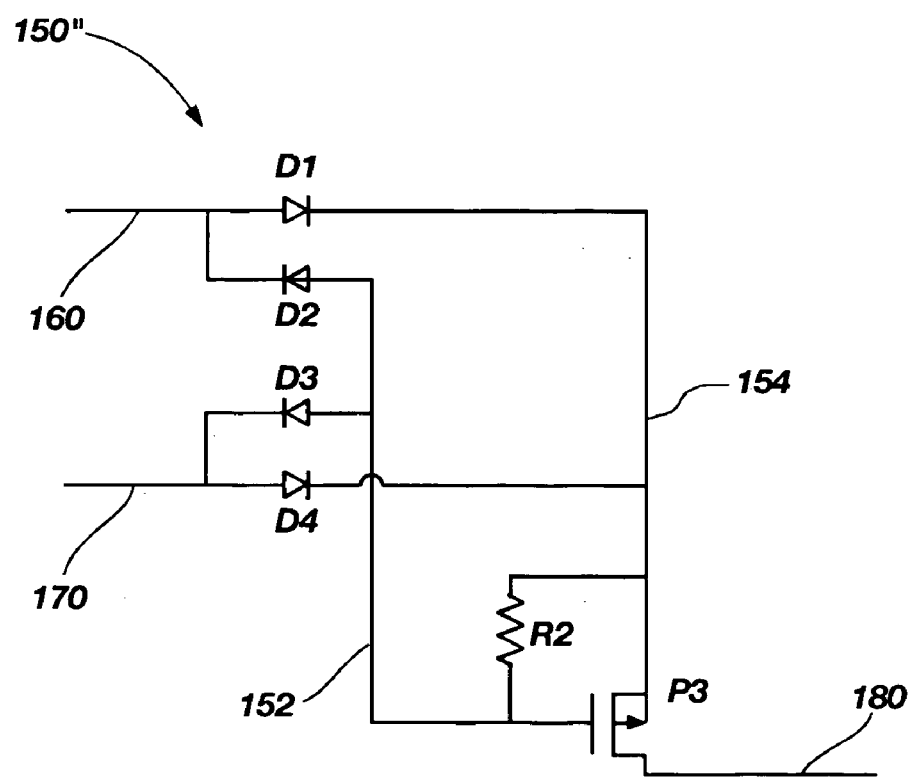

FIG. 2B illustrates another exemplary arrangement 150'' for implementing the exclusive-OR function wherein discrete components are utilized. The embodiment of FIG. 2B is similar to the embodiment of FIG. 2A except that the resistive pull-up device R2 connects to the cathodes of the first diode D1 and the second diode D2, rather than to the power source 102. In addition, a single p-channel device P3 generates the enable signal 180.

Many other discrete component combinations are possible and encompassed by the scope of the invention. For example, discrete component implementations similar to the exemplary arrangements 150 and 150'', may be implemented using one or two n-channel devices, rather than the p-channel devices, in combination with diodes and resistive elements.

The motor control circuit 100 of the present invention may be used to control a motor 400 in association with a variety of applications. In one exemplary embodiment, the motor control circuit 100 may be used to control a movable door or a movable partition such as is described in U.S. Pat. No. 6,662,848 entitled AUTOMATIC DOOR AND METHOD OF OPERATING SAME, the disclosure of which is incorporated herein by this reference in its entirety. Of course, numerous other applications are contemplated as will be appreciated by those of ordinary skill in the art.

While the present invention has been described herein with respect to certain preferred embodiments, those of ordinary skill in the art will recognize and appreciate that it is not so limited. Rather, many additions, deletions, and modifications to the preferred embodiments may be made without departing from the scope of the invention as hereinafter claimed. In addition, features from one embodiment may be combined with features of another embodiment while still being encompassed within the scope of the invention as contemplated by the inventors.

What is claimed is:

1. A motor control circuit, comprising:
   a first relay configured for operably coupling a power source to a first relay output when a first control signal is asserted, and operably coupling a ground to the first relay output when the first control signal is negated;
   a second relay configured for operably coupling the power source to a second relay output when a second control signal is asserted, and operably coupling the ground to the second relay output when the second control signal is negated;
   a logic element configured for negating an enable signal if both the first control signal and the second control signal are asserted, negating the enable signal if both the first control signal and the second control signal are negated, and otherwise asserting the enable signal;
   a third relay configured for operably coupling the first relay output to a first motor terminal when the enable signal is asserted, and operably coupling a third relay input to the first motor terminal when the enable signal is negated;
   a fourth relay configured for operably coupling the second relay output to a second motor terminal when the enable signal is asserted, and operably coupling a fourth relay input to the second motor terminal when the enable signal is negated; and
   a connection element operably coupling the third relay input to the fourth relay input.

2. The motor control circuit of claim 1, wherein the logic element comprises an exclusive-OR function.

3. The motor control circuit of claim 1, wherein the connection element comprises an impedance element configured for dissipating energy from a rotational inertia energy of the motor when the enable signal is asserted.

4. The motor control circuit of claim 3, wherein the impedance element comprises a resistor.

5. The motor control circuit of claim 1, further comprising an over-voltage protector operably coupled between the first motor terminal and the second motor terminal, the over-voltage protector configured for discharging a substantially high voltage between the first motor terminal and the second motor terminal to substantially protect the third relay and the fourth relay from arcing damage.

6. The motor control circuit of claim 1, wherein a change in the enable signal occurs a time delay after a change in the first control signal or a change in the second control signal.

7. A system, comprising:
   a motor including a first motor terminal and a second motor terminal; and
   a motor control circuit comprising:
      a first relay configured for operably coupling a power source to a first relay output when a first control signal is asserted, and operably coupling a ground to the first relay output when the first control signal is negated;
      a second relay configured for operably coupling the power source to a second relay output when a second control signal is asserted, and operably coupling the ground to the second relay output when the second control signal is negated;
      a logic element configured for negating an enable signal if both the first control signal and the second control signal are asserted, negating the enable signal if both the first control signal and the second control signal are negated, and otherwise asserting the enable signal;
      a third relay configured for operably coupling the first relay output to the first motor terminal when the enable signal is asserted, and operably coupling a third relay input to the first motor terminal when the enable signal is negated;
      a fourth relay configured for operably coupling the second relay output to the second motor terminal when the enable signal is asserted, and operably coupling a fourth relay input to the second motor terminal when the enable signal is negated; and
      a connection element operably coupling the third relay input to the fourth relay input.

8. The system of claim 7, wherein the logic element comprises an exclusive-OR function.

9. The system of claim 7, wherein the connection element comprises an impedance element configured for dissipating energy from a rotational inertia energy of the motor when the enable signal is asserted.

10. The system of claim 9, wherein the impedance element comprises a resistor.

11. The system of claim 7, further comprising an over-voltage protector operably coupled between the first motor terminal and the second motor terminal, the over-voltage protector configured for discharging a substantially high voltage between the first motor terminal and the second motor terminal to substantially protect the third relay and the fourth relay from arcing damage.

12. The system of claim 7, wherein a change in the enable signal occurs a time delay after a change in the first control signal or a change in the second control signal.

13. The system of claim 7, wherein the motor comprises a direct current (DC) motor rated at approximately 14 volts or higher.

14. The system of claim 7, wherein the motor is drivingly coupled to at least a portion of a movable partition.

15. The system of claim 14, further comprising a movable partition and a coupling element between an output component of the motor and at least a portion of the movable partition.

16. The system of claim 15, wherein the movable partition includes a plurality of hingedly coupled panels.

17. The system of claim 16, wherein the movable partition is sized, constructed and configured as a fire barrier.

18. A method of controlling a motor, comprising:
rotating the motor in a first rotational direction if a first control signal is asserted and a second control signal is negated;
rotating the motor in a second rotational direction if the first control signal is negated and the second control signal is asserted; and
impeding rotation of the motor if both the first control signal and the second control signal are asserted, or if both the first control signal and the second control signal are negated by performing the acts comprising:
disconnecting a first motor terminal from a power source;
disconnecting a second motor terminal from a ground; and
coupling the first motor terminal to the second motor terminal, wherein the acts of disconnecting the first motor terminal and disconnecting the second motor terminal are performed before the act of coupling the first motor terminal to the second motor terminal.

19. The method of claim 18, further comprising dissipating a rotational inertia energy of the motor through an impedance element when the act of impeding rotation of the motor occurs.

20. The method of claim 18, further comprising protecting a third relay and a fourth relay from arcing damage due to a substantially high voltage by operably coupling an over-voltage protector between the first motor terminal and the second motor terminal.

21. A method of controlling a motor, comprising:
rotating the motor in a first rotational direction if a first control signal is asserted and a second control signal is negated;
rotating the motor in a second rotational direction if the first control signal is negated and the second control signal is asserted;
impeding rotation of the motor if both the first control signal and the second control signal are asserted, or if both the first control signal and the second control signal are negated; and
protecting a third relay and a fourth relay from arcing damage due to a substantially high voltage by operably coupling an over-voltage protector between the first motor terminal and the second motor terminal.

22. The method of claim 21, further comprising dissipating a rotational inertia energy of the motor through an impedance element when the act of impeding rotation of the motor occurs.

* * * * *